(12) United States Patent
Beraud et al.

(10) Patent No.: US 9,922,757 B2
(45) Date of Patent: Mar. 20, 2018

(54) PROCESS FOR MAKING MATERIAL WITH IMPROVED CONDUCTIVITY PROPERTIES FOR THE PRODUCTION OF COMPOSITE PARTS

(71) Applicant: HEXCEL REINFORCEMENTS, Dublin, CA (US)

(72) Inventors: Jean-Marc Beraud, Rives (FR); Andrea Viard, Cremieu (FR)

(73) Assignee: Hexcel Reinforcements, Dagneux (FR)

( * ) Notice: Subject to any disclaimer, the term of this patent is extended or adjusted under 35 U.S.C. 154(b) by 0 days.

(21) Appl. No.: 15/285,286

(22) Filed: Oct. 4, 2016

(65) Prior Publication Data

US 2017/0025205 A1    Jan. 26, 2017

Related U.S. Application Data

(62) Division of application No. 14/383,965, filed as application No. PCT/FR2013/050690 on Mar. 28, 2013, now Pat. No. 9,508,471.

(30) Foreign Application Priority Data

Apr. 2, 2012    (FR) ...................... 12 52979

(51) Int. Cl.
| | |
|---|---|
| *H01B 13/30* | (2006.01) |
| *B29C 70/88* | (2006.01) |
| *B29C 70/08* | (2006.01) |
| *B29C 70/12* | (2006.01) |
| *B29C 70/20* | (2006.01) |
| *H01B 1/22* | (2006.01) |

(Continued)

(52) U.S. Cl.
CPC .......... *H01B 13/30* (2013.01); *B29C 70/083* (2013.01); *B29C 70/12* (2013.01); *B29C 70/20* (2013.01); *B29C 70/48* (2013.01); *B29C 70/882* (2013.01); *H01B 1/22* (2013.01); *H01B 1/24* (2013.01); *H01B 13/06* (2013.01); *B29K 2307/04* (2013.01); *B29K 2995/0005* (2013.01); *Y10T 428/24124* (2015.01)

(58) Field of Classification Search
CPC ...................................................... H01B 13/30
USPC ......................................................... 427/113
See application file for complete search history.

(56) References Cited

U.S. PATENT DOCUMENTS

| | | | | |
|---|---|---|---|---|
| 6,096,669 | A * | 8/2000 | Colegrove | .............. B29B 11/16 264/136 |
| 6,503,856 | B1 | 1/2003 | Broadway et al. | |

(Continued)

FOREIGN PATENT DOCUMENTS

| | | |
|---|---|---|
| EP | 0465399 | 1/1992 |
| EP | 1125728 | 10/2011 |

(Continued)

*Primary Examiner* — Brent O'Hern
(74) *Attorney, Agent, or Firm* — W. Mark Bielawski; David J. Oldenkamp

(57) ABSTRACT

A process for making a material adapted for the production of composite parts by a process in which a thermoplastic or thermosetting matrix is diffused within said material. The material includes at least one sheet of unidirectional carbon fibers associated on at least one of its faces with at least one conductive component associated or integrated with a permeable layer in a thermoplastic material or in a mixture of thermoplastic or thermosetting materials.

19 Claims, 2 Drawing Sheets

(51) Int. Cl.
  *H01B 1/24*    (2006.01)
  *H01B 13/06*   (2006.01)
  *B29C 70/48*   (2006.01)
  *B29K 307/04*  (2006.01)

(56) References Cited

U.S. PATENT DOCUMENTS

| | | |
|---|---|---|
| 6,828,016 B2 | 12/2004 | Mitani et al. |
| 7,435,693 B2 | 10/2008 | Tsotsis et al. |
| 2003/0008125 A1 | 1/2003 | Delanoy et al. |
| 2010/0330859 A1 | 12/2010 | Soula et al. |
| 2011/0114895 A1 | 5/2011 | Lengsfeld |
| 2011/0294387 A1 | 12/2011 | Simmons et al. |
| 2012/0015135 A1 | 1/2012 | Beraud et al. |
| 2012/0015167 A1 | 1/2012 | Beraud et al. |
| 2012/0237707 A1 | 9/2012 | Berarud et al. |

FOREIGN PATENT DOCUMENTS

| | | |
|---|---|---|
| FR | 2937583 A1 | 4/2010 |
| JP | 2006-265769 | 10/2006 |
| JP | 2007-301838 A | 11/2007 |
| WO | 93/15904 | 8/1993 |
| WO | 99/21697 A1 | 5/1995 |
| WO | 2000/58083 | 10/2000 |
| WO | 2007/015706 | 2/2007 |
| WO | 2006/121961 | 11/2009 |
| WO | 2010/037991 A1 | 4/2010 |
| WO | 2010-061114 | 6/2010 |
| WO | 2011/051697 | 5/2011 |
| WO | 2011/51698 | 5/2011 |
| WO | 2011/075344 A1 | 6/2011 |
| WO | 2011/08266 | 7/2011 |
| WO | 2011/086266 | 7/2011 |
| WO | 2011/148237 | 12/2011 |

* cited by examiner

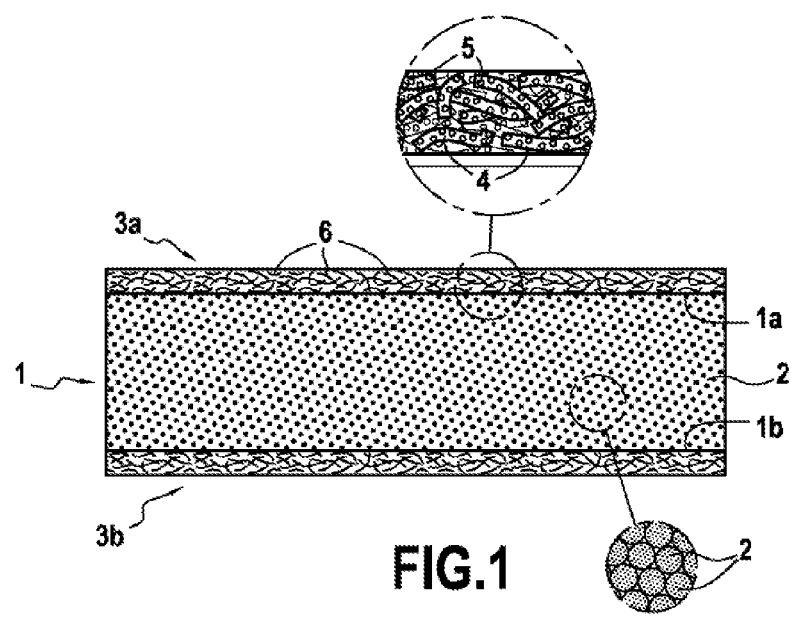
FIG.1
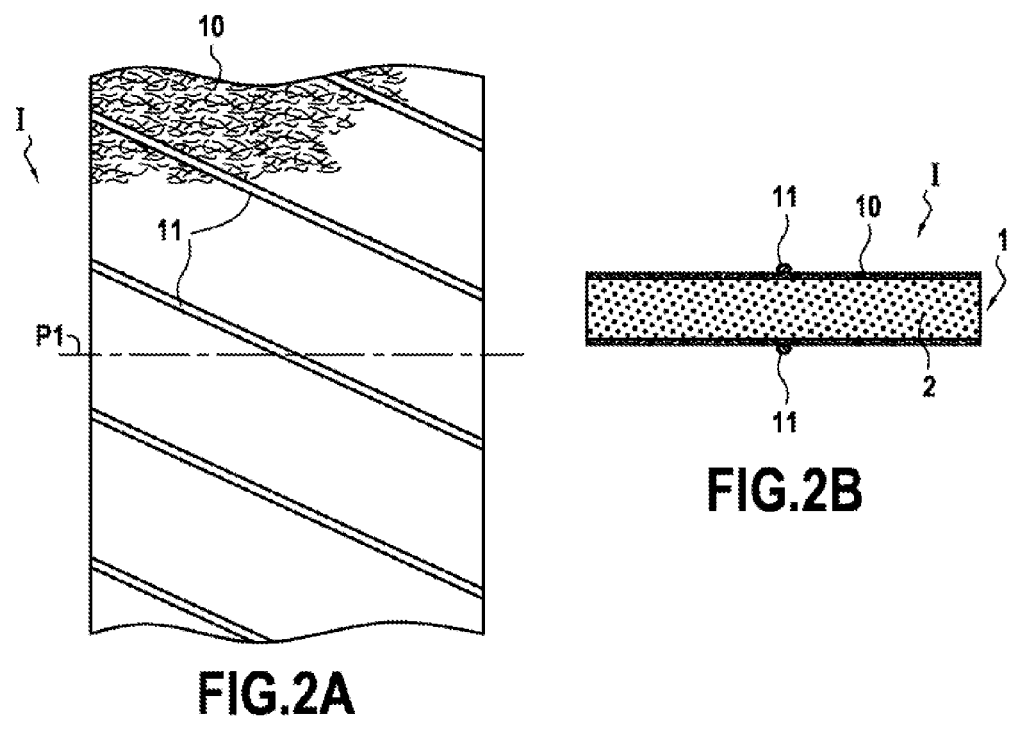
FIG.2A
FIG.2B

PROCESS FOR MAKING MATERIAL WITH IMPROVED CONDUCTIVITY PROPERTIES FOR THE PRODUCTION OF COMPOSITE PARTS

This application is a divisional of U.S. Ser. No. 14/383,965, which was filed on Sep. 9, 2014, and which is a 371 of PCT/FR2013/050690, filed on Mar. 28, 2013.

BACKGROUND OF THE INVENTION

1. Field of the Invention

The invention concerns the technical field of so-called "dry" reinforcement materials, adapted to the creation of composite parts in association with a thermosetting or thermoplastic resin which will be diffused within said materials to create the final composite part. Specifically, the invention relates to a new intermediate material based on unidirectional sheets of carbon fibre, combining satisfactory mechanical strength and electrical conductivity properties, adapted to the design of composite parts by subsequent injection or infusion of a thermosetting or thermoplastic resin, or of a mixture of such resins, and relates as well to a process for the fabrication of composite parts from such a material, and to the composite parts thus obtained.

2. Description of Related Art

The fabrication of composite parts or products, that is to say consisting of, first of all, one or more fibrous reinforcements or sheets, and second of all, a matrix primarily of the thermosetting ("resin") type, which may include thermoplastics, can for example be performed with a process called "direct" or "LCM" ("Liquid Composite Moulding" in English). A direct process is defined by the fact that one or several fibre reinforcements are prepared in a "dry" state (that is, without the final matrix), the resin or the matrix being prepared separately, for example by injection into the mould containing the reinforcement fibres ("RTM" process, Resin Transfer Moulding), by infusion through the thickness of the reinforcement fibres ("LRI" process, "Liquid Resin Infusion" in English or "RFI" process, "Resin Film Infusion"), or else by manual coating/impregnation with a roller or brush on each of the unit layers of fibrous reinforcement, applied successively on the mould.

For the RTM, LRI or RFI processes, it is generally first necessary to build a fibrous preform in the shape of the desired finished product, then to impregnate this preform with a resin. The resin is injected or infused by differential pressure at temperature, then once all the amount of necessary resin is contained in the preform, the assembly is brought to a higher temperature to complete the polymerization/crosslinking cycle and thus harden it.

Composite parts used in the automobile, aviation or naval industry are particularly subject to very strict requirements, notably in terms of their mechanical properties. To conserve fuel, the aviation industry has replaced many metallic materials with composite materials that are lighter. In addition, many hydraulic flight controls are replaced by electronic controls also in the interest of weight reduction.

The resin which is subsequently associated, in particular by injection or infusion, to the unidirectional reinforcement sheets during the creation of the part can be a thermosetting resin, an epoxy for example. To allow proper flow through a preform consisting of a stack of different layers of carbon fibres, the resin is most often very fluid, for example with a viscosity on the order of 50 to 200 mPa·s. at the infusion/injection temperature. The major inconvenience of this type of resin is its fragility after polymerization/crosslinking, which results in poor impact resistance of the fabricated composite parts.

In order to solve this problem, the documents of previous art proposed the association of the unidirectional layers of carbon fibres to intermediate layers based on resin, and notably to a web of thermoplastic fibres. Solutions such as these are notably described in patent applications or patents EP 1125728, U.S. Pat. No. 6,828,016, WO 00/58083, WO 2007/015706, WO 2006/121961 and U.S. Pat. No. 6,503,856. The addition of this intermediate layer of resin, such as a web, makes it possible to improve mechanical properties in the compression after impact (CAI) test commonly used to characterize the impact resistance of structures.

In the earlier patent applications WO 2010/046609 and WO 2010/061114, the applicant has also proposed particular intermediate materials comprising a sheet of unidirectional fibres, particularly carbon, associated by adhesion on each of its faces to a non-woven of thermoplastic fibres (also called non-woven), as well as their preparation process.

Such composite materials consist of layers of carbon and layers of thermosetting or thermoplastic material. The carbon fibre is electrically conductive, unlike the thermosetting or thermoplastic materials. The stack of these two materials is thus a stack of conductive materials and insulating materials. The transverse electrical conductivity is near-zero due to the presence of resin layers.

However, in order to dissipate the energy of lightning moving over the fuselage or the wings, and also to assure the function of return current, the transverse electrical conductivity of composite parts used in aviation must be high. Because fuel reserves are located in the wings of planes, it is essential to successfully dissipate the electrical energy and therefore to achieve good conductivity along the axis orthogonal to the surface of the part, called the z-axis. In aircraft structures, electrical conductivity has been provided until now by the material itself, which was mostly based on aluminium. Because the new aircraft models integrate more and more composite materials, mainly based on carbon, it has become essential to provide additional conductivity to assure the functions of return current and resistance to lightning. This conductivity is achieved currently on composite parts based on carbon fibres by the local use of metallic ribbons or rovings that bind the parts to each other. Such a solution greatly increases the weight and cost of the composite solution, and is therefore not satisfactory.

In order to provide materials having a good electrical conductivity, patent application U.S. 2003/0008125 provides for associating a sheet of unidirectional carbon fibres with a carbon non-woven and assuring their bonding with a thermoplastic layer. The thermoplastic layer is used to impregnate the carbon layers. The disclosed material, in particular because of the use of a non-porous thermoplastic layer and the lack of precision regarding the amount of thermoplastic resin present is not suitable for use in direct processes such as described above.

Patent application WO 99/21697 also provides for associating unidirectional carbon sheets with carbon non-wovens, but only in order to provide materials suitable for direct processes. For this, the association between the various layers is assured by a grid made of a polymerizable material, that is to say, thermosetting, so as to limit the amount of polymerizable material present to 6 to 12% by weight of the total weight of the material.

SUMMARY OF THE INVENTION

In this context, the invention concerns a material adapted for the production of composite parts by a process in which an external thermoplastic or thermosetting matrix is diffused within said materials, comprising at least one sheet of unidirectional carbon fibres associated on at least one of its faces with at least one conductive component. Said conductive component is associated or integrated with a permeable layer in a thermoplastic material or in a mixture of thermoplastic and thermosetting materials, said permeable layer being in the form of a fabric, a powder, a porous film, a knit, or, preferably, a non-woven. Such layer allows at the same time the flow of the resin that will be injected or infused during the subsequent fabrication of a composite part.

In the context of the invention, preferably, each sheet of unidirectional carbon fibres present in the material is bound to at least one conductive component which is associated or integrated to a permeable layer in a thermoplastic material or in a mixture of thermoplastic and thermosetting materials, said permeable layer being in the form of a fabric, a powder, a porous film, a knit, or, preferably a non-woven.

Such a material is for the fabrication of composite parts by direct process. The material according to the invention contains not more than 10% of thermoplastic material or thermosetting and thermoplastic materials, and in particular the quantity of thermoplastic material or a mixture of thermoplastic and thermosetting materials is 0.5 to 10% of the total weight of the material.

The invention also relates to a process of fabricating a composite part characterized in that it comprises the following steps:
  a) have at least one material according to the invention.
  b) diffuse, by infusion or injection, a thermosetting resin, a thermoplastic resin or a mixture of such resins, in the material or materials,
  c) harden the desired part with a step of polymerization/crosslinking in a defined cycle at temperature and under pressure, followed by cooling.

The composite parts that can be obtained by the process according to the invention, whatever its alternative implementations may be, are also an integral part of the invention.

The materials, processes and composite parts according to the invention are described in detail in the description that follows, with reference to the accompanying Figures.

BRIEF DESCRIPTION OF THE DRAWINGS

FIG. 1 is a cross-section schematic view of an example of a material according to the invention.

FIGS. 2A and 2B are schematic views respectively from above and in cross section along the plane P1 of another example of a material according to the invention.

DETAILED DESCRIPTION OF THE INVENTION

Figure 3A:
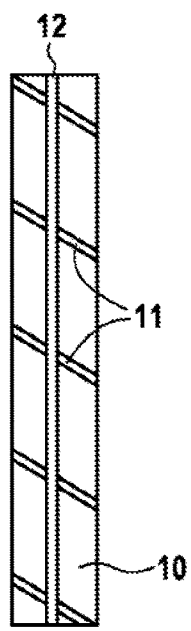
FIGS. 3A, 3B and 3C are schematic views respectively from above and in cross section along the plane P2 of one example of a material according to the invention using conductive yarns.

The invention provides for associating a sheet of unidirectional carbon fibres to at least one conductive component that assures an electrical conductivity. The conductive component may be in particular in the form of particles, short fibres or yarns. The conductive component may be a conductive material or only its surface may be a conductive material. Short fibres is understood as fibres of less than 1 millimeter long. The conductive material consists, for example, of carbon, graphite, nickel, gold, platinum, palladium, silver, copper or cobalt. In the context of the invention, the particles or the conductive fibres may consist of a wide variety of materials such as metallized glass, carbon, metallized carbon, graphite, metallized polymers, metal fibres and mixtures thereof. Carbon fibres will be preferred, particularly from 20 to 200 micrometers long.

The sheet or sheets of unidirectional carbon fibres and the conductive component or components present in the material may be bonded by sewing, by knitting, by an adhesive or by thermal bonding. In materials according to the invention, the association between the unidirectional sheet and the conductive components can be discontinuous, for example only at certain points or areas, or may be achieved by means of a bond qualified as continuous extending over the entire surface of the sheet or of the conductive components. The association between the unidirectional sheet and conductive components can be done by means of an adhesive layer, for example selected from among epoxy adhesives, polyurethane adhesives, thermosetting glues, adhesives based on polymerizable monomers, structural acrylic or modified acrylic adhesives, hot melt adhesives.

In the context of the invention, the conductive component is associated or integrated with a thermoplastic material or a mixture of thermoplastic and thermosetting materials. In the case of using a mixture of thermosetting and thermoplastic materials, the thermosetting materials represent, preferably, less than 50% of the total weight of the mixture, and for example less than 20%. Preferably, the binding between unidirectional sheet and conductive components will be achieved through this thermoplastic material. The conductive component/thermoplastic material or conductive component/thermoplastic and thermosetting materials weight ratio is, for example, from 0.3 to 50%, preferably from 0.5 to 5%. Such lower ratios make it possible to limit the amount of materials not working mechanically and which tend to increase the structure. A lower rate of conductive component will therefore be desirable for a given conductivity.

The thermoplastic material or the mixture of thermoplastic and thermosetting materials forms a permeable layer. In the context of the invention it is preferable to use a permeable layer made of a thermoplastic material only, or even a mixture of thermoplastic and thermosetting materials, rather than a permeable layer in a thermosetting material. Indeed, the use of unpolymerized thermosetting material makes use of perishable materials and requires storage at temperatures of about −18° C. to prolong their shelf life, which is a drawback that the thermoplastic materials do not have.

This layer is characterized as permeable because it must allow the passing of the thermosetting or thermoplastic resin that is going to be diffused during the fabrication of the composite part and that must penetrate the entire volume of the part. Each assembly of permeable layer+conductive component(s) will preferably have an openness factor in the range of around 30 to 99%, preferably in the range of around 40 to 70%. The openness factor can be defined as the ratio between the area not occupied by the material and the total area observed, where the observation can be made from above the material with a light from below it. It may, for example, be measured by the method described in application WO 2011/086266 and will be expressed as a percentage. An assembly of permeable layer+conductive component(s) is understood as the part of the material corresponding to the conductive component(s) associated or integrated with the thermoplastic material or the mixture of thermoplastic and thermosetting materials situated on one side of a unidirectional sheet or between two unidirectional sheets.

Said permeable layer is in the form of a fabric, a powder, a porous film, or preferably a non-woven. Advantageously, each assembly of permeable layer+conductive component(s) has a basis weight in the range of 0.5 to 30 gi/m, preferably in the range of 1 to 15 g/m². Such a basis weight makes it possible to reduce the weight of the material having no reinforcing function that does not work mechanically in a direct manner. Such a relatively low mass is also associated with a relatively low thickness, which makes it possible to optimize the thickness of the final material.

Each permeable layer+conductive component(s) has for example, a thickness of 5 to 30 microns, preferably from 5 to 20 microns. The total thickness of the material of the invention depends on the thickness of the reinforcement, thus directly on its textile architecture, which in the case of the invention is a sheet of unidirectional fibres, but also the thickness of the permeable layer. By selecting the conductive components and permeable layers so as to have such thickness, the person skilled in the art can optimize the fibre volume ratio to be obtained for direct processes by utilizing resin infusion or injection. In fact, particularly when the infusion process is used, it is important to obtain a Fibre Volume Ratio in the range of 55% to 70%, which may particularly be obtained with such thicknesses for the permeable layers.

In the context of the present invention, the thicknesses and weights are, for example, determined according to the techniques described in patent application WO 2010/046609.

Furthermore, it is important, when stacking multiple layers of materials according to the invention, to obtain a preform thickness close to final thickness of the injected or infused resin finished part. To do this, the thickness corresponding to the conductive components and in the thermoplastic material or mixture of thermoplastic and thermosetting materials should also be as low as possible.

Preferably, the sheet or sheets of unidirectional carbon fibres and the conductive component or components present in the material are bonded by the thermoplastic material or mixture of thermoplastic and thermosetting materials by thermobonding.

The following provisions of the conductive components and the thermoplastic material or mixture of thermoplastic and thermosetting materials, compared to unidirectional sheets are, in particular, possible:

In a first implementation, the conductive component can appear in the form of conductive particles or fibres distributed in a thermoplastic matrix, or in a mixture of thermoplastic and thermosetting materials, forming a fabric, a knit, or preferably a non-woven. Such conductive particles may appear in the form of nanospheres, nanotubes, fibres, etc. Notably it is possible to use carbon powder or carbon fibres. The weight ratio of conductive particles/thermoplastic polymer or conductive particles/mixture of thermoplastic and thermosetting materials will notably be 0.3% to 5%, and the weight ratio of conductive fibres/thermoplastic polymer or conductive fibres/mixture of thermoplastic and thermosetting materials will notably be 1% to 50%. These percentage differences are due to the viscosity constraints of the material (thermoplastic materials or thermosetting and thermoplastic materials+conductive components) used to produce the fibres constituting the fabric or non-woven. FIG. 1 illustrates such an embodiment wherein a sheet 1 of unidirectional carbon fibres 2 is associated to each of its major surfaces 1a and 1b to a non-woven 3a and 3b of fibres 6 composed of a thermoplastic matrix 4 wherein the carbon nanoparticles 5 are distributed.

In a second implementation, the conductive component may be positioned adjacent to a layer of thermoplastic material or to a mixture of thermoplastic and thermosetting materials. In this case where the conductive component is positioned on the surface of a layer of thermoplastic material or of a mixture of thermoplastic and thermosetting materials, it is particularly important for the layer of thermoplastic material or of a mixture of thermoplastic and thermosetting materials to have an openness factor as mentioned above sufficient to allow the conductive components to touch each other, thereby ensuring a transverse conductivity within a stack comprising different sheets of unidirectional carbon fibres, especially when the latter is subjected to a pressure of 1 bar. The conductive component may be positioned between a sheet of unidirectional carbon fibres and a layer of thermoplastic material or of a mixture of thermoplastic and thermosetting materials, or a layer of thermoplastic material or of a mixture of thermoplastic and thermosetting materials can be positioned between a sheet of unidirectional carbon fibres and the conductive component. In this case, the conductive component can be in the form of particles or conductive fibres, a conductive metallic deposit or conductive fibres. The conductive component may be deposited directly on the sheet of unidirectional carbon fibres, a layer of thermoplastic material or of a mixture of thermosetting and thermoplastic materials being deposited thereon. This layer of thermoplastic material or of a mixture of thermoplastic and thermosetting materials ensures, preferably, the bond between the conductive component and the sheet of unidirectional carbon fibres. It is equally possible for the conductive component to be deposited on at least a portion of the surface of the layer of thermoplastic material or of a mixture of thermoplastic and thermosetting materials which may be notably a fabric or, preferably a non-woven of thermoplastic fibres or of a mixture of thermosetting and thermoplastic fibres. In this case, the layer of thermoplastic material or of a mixture of thermosetting and thermoplastic materials will be sandwiched between the conductive components and the sheet of unidirectional carbon fibres.

When a metal conductor deposition is used, it can be produced by any appropriate method such as vapour deposition, sintering, vacuum deposition, sputtering or electroplating. The metal conductor can be deposited at 0 to 5 g/m². It is also possible to deposit the metal on the surface along solid lines, in waves or other patterns. Preferably, a contact is established between the various patterns, for example by the use of crossed lines so as to ensure conductivity in at least one direction. Preferably, a metal deposit will be produced so as to cover at least 5% of the surface on which it is deposited, and preferably at least 10 to 40% of this surface, and in particular from 10 to 60% of this surface, and to create, preferably, a continuous conductive network. It is also possible to produce a metallization along parallel lines and to obtain crossed lines in a stack of several materials according to the invention and thus to obtain a transverse conductivity within the stack. Preferably, the metallization is carried out in at least a set of parallel lines, but not parallel to the direction of the fibres in the closest unidirectional sheet(s), and preferably along at least two sets of intersecting parallel lines. These same configurations of parallel lines can be implemented with the use of conductive yarns. Such conductive yarns will have individual counts, for example, 5 dTex to 100 dTex, and preferably 20 to 80 dTex. Such conductive yarns, for example graphite or metal, have preferably a relatively low linear resistivity, preferably of $10^{-3}$ to $10^9$ Ω/cm, and preferably from $10^{-3}$ to $10^2$ Ω/cm.

As in the case of a metal deposit, the conductive yarns will be deposited so as to cover at least 5% of the surface on which they are deposited, and preferably at least 10 to 40% of this surface, and preferentially from 10 to 60% of this surface, and to create, preferably, a continuous conductive network.

FIGS. 2A and 2B illustrate an implementation method wherein a set of conductive yarns 11 parallel to each other but forming an angle of 50° with the unidirectional sheet of carbon fibres in the illustrated example, are positioned on a non-woven 10, which is itself deposited on a sheet 2 of unidirectional carbon fibres. FIG. 2B shows such a material I containing a single sheet of unidirectional carbon fibres associated on each of its surfaces to a non-woven 10 and to a conductive component 11. During the implementation of a stack, the materials I will be positioned so that the conductive yarns of the two successive materials cross each other, thus obtaining a transverse conductivity within the stack.

Figure 3C:
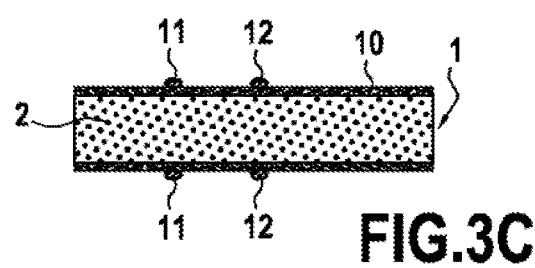
Figure 3B:
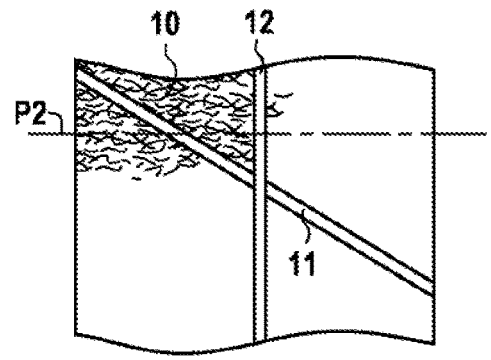

FIGS. 3A, 3B and 3C illustrate another embodiment method wherein a sets of conductive yarns 11 parallel to each other but forming an angle of 50° with the unidirectional sheet of carbon fibres in the illustrated example, is positioned on a non-woven 10 which is itself deposited on a sheet 2 of unidirectional carbon fibres, as in the case of FIG. 2A. But additionally, a conductive yarn 12 is also deposited extending parallel to the fibres of the unidirectional sheet of carbon 2.

Figure 4B:
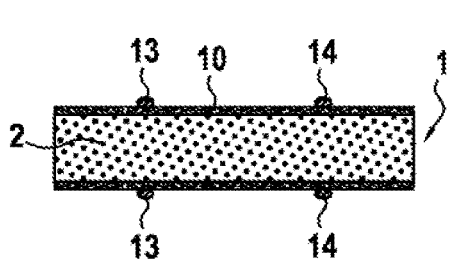
FIGS. 4A and 4B are schematic views respectively from above and in cross section along the plane P3 of another example of a material according to the invention using conductive yarns.
Figure 4C:
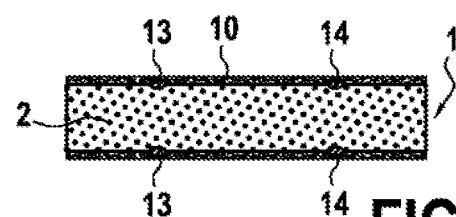
FIGS. 4C, 4D and 4E are Figures analogous to FIG. 4B, showing other positions of the conductive yarns.
Figure 4D:
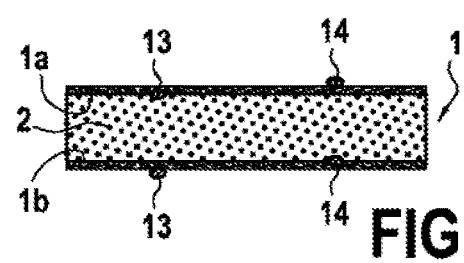
Figure 4A:
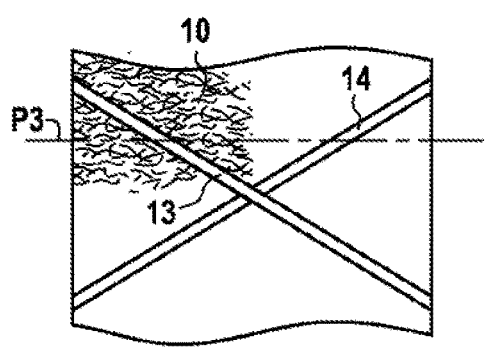
Figure 4E:
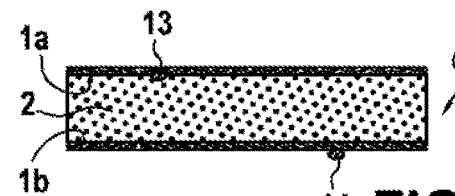

FIGS. 4A and 4B illustrate another method of implementation wherein two sets of conductive yarns 13 and 14 parallel to each other in each set are positioned on a non-woven 10, itself deposited on a sheet 2 of unidirectional carbon fibres. The conductive yarns 13 and 14 of both these sets intersect each forming an angle with the unidirectional carbon fibre sheet, which is respectively +50° and −50° in the illustrated example. It is equally possible as shown FIG. 4C for the conductive yarns 13 and 14 to be positioned between the unidirectional fibre sheet 2 and the two unidirectional fibre non-wovens 10. FIG. 4D illustrates another implementation method wherein on the surface 1a of the sheet the conductive yarns 13 are positioned between the non-woven 10 and unidirectional fibres 2, and the conductive yarns 14 are positioned on the non-woven 10, while on the surface 1b, the conductive yarns 14 are positioned between the non-woven 10 and the sheet of unidirectional fibres 2 and the conductive yarns 13 are positioned on the non-woven 10. FIG. 4E illustrates another implementation method wherein on the surface 1a of the sheet the conductive yarns 13 are positioned between the non-woven 10 and the unidirectional fibre sheet 2, while on the surface 1b the conductive yarns 14 are positioned on the non-woven 10. As in the previous cases, the conductive yarns 13 and 14 are parallel to each other in each set, but the conductors 13 and 14 of these two sets are intersecting and the conductive yarns of each set form an angle with the sheet of unidirectional carbon fibres.

All these variants are presented in the case of a material containing only one unidirectional carbon fibre sheet, this material being intended for stacking, but they also apply to a material containing several unidirectional carbon fibre sheets between which are sandwiched conductive components and layers of thermoplastic material or of a mixture of thermoplastic and thermosetting materials.

In a third implementation method, the conductive component may also appear in the form of particles, such as carbon powder, or of short fibres such as carbon fibres mixed with a thermoplastic material powder, or of a mixture of thermoplastic and thermosetting materials. The weight ratio of conductive particles/thermoplastic polymer or conductive particles/mixture of thermoplastic and thermosetting materials, will notably be 0.3% to 20%, and the weight ratio of conductive fibres/thermoplastic polymer or conductive fibres/mixture of thermoplastic and thermosetting materials will notably be 5% to 20%. In this case, the mixture of conductive component/powder of thermoplastic material or of a mixture of thermoplastic and thermosetting materials will be deposited directly on the surface of the sheet of unidirectional fibres.

Preferably, the one or more permeable layers of thermoplastic material or of a mixture of thermoplastic and thermosetting materials present in the material are in a non-woven form, thereby imparting improved mechanical properties to the fabricated composite final part. Non-woven, which may also be called "web", is conventionally understood to mean a set of continuous fibres or of short randomly placed fibres. These non-wovens or webs may for example be produced by dry processes ("Drylaid"), wet processes ("Wetlaid"), by melting ("Spunlaid"), for example by extrusion ("Spunbond"), by extrusion blow-moulding ("Meltblown"), or by solvent spinning ("Electrospinning", "Flashspinning"), well known to the person skilled in the art. In particular, the fibres composing the non-woven will have average diameters in the range of 0.5 to 70 µm, and preferably in the range of 0.5 to 20 µm. Non-wovens can be composed of short fibres or preferably, of continuous fibres. In the case of a short-fibre non-woven, the fibres can for instance have a length of 1 to 100 mm. Non-wovens offer random and preferably isotropic coverage.

Preferably, the layer formed at the same time by the thermoplastic material or the mixture of thermoplastic and thermosetting materials and the conductive component preferably has a conductivity at least in one direction, of at least 500 S/m, and preferably 5000-20000 S/m. In such a case, the conductive component is present directly at least on a part of the surface of the layer formed both of the thermoplastic material or the mixture of thermoplastic and thermosetting materials, and of the conductive component. However, according to a non-preferred embodiment, it is also possible for the conductive component to be encapsulated in a material in which it is momentarily isolated and for its conducting ability to be revealed only at the time the final composite part is created. This would be the case for example, if the conductive component is present in the form of particles encapsulated in a polymer soluble in the resin matrix that will be diffused within the material during the production of the composite part. Some polyethersulphones are, for example, soluble in epoxy resins.

As part of the invention, a "unidirectional sheet of carbon fibres" means a sheet composed entirely or almost entirely of carbon fibres laid in the same direction, so as to spread essentially parallel to each other. Specifically, in a particular embodiment of the invention, the unidirectional sheet does not have any weft filament interlacing the carbon fibres, or even stitching for the purpose of giving cohesion to the unidirectional sheet before its association with the permeable layer comprising at least one conductive element. This makes it possible in particular to avoid any ripples in the unidirectional sheet.

In the unidirectional sheet, the carbon yarns are preferably not associated with a polymeric binder and are therefore designed as dry, meaning that they are neither impregnated, nor coated, nor associated with any polymeric binder before their association with the permeable layer. Carbon fibres are, however, most often characterized by a standard mass emission rate that can represent at most 2% of their weight.

In particular, the thermoplastic material or the mixture of thermoplastic and thermosetting materials form the permeable layer or layers representing from 0.5 to 10% of the total weight of the material, and preferably from 1 to 3% of the total weight of the material.

The fibres constituting the unidirectional sheets are, preferably, continuous. The unidirectional sheets may consist of one, or preferably several carbon yarns. A carbon yarn is composed of a bundle of filaments and generally contains 1,000 to 80,000 filaments, and usefully 12,000 to 24,000 filaments. Particularly preferred for the embodiment of the invention, carbon yarns of 1 to 24 K, for example 3K, 6K, 12K or 24K, and preferably of 12 and 24K are used. For example, the carbon yarns present in the unidirectional sheets, have a count of 60 to 3800 tex, and preferably of 400 to 900 tex. The unidirectional sheet can be created with any type of carbon yarns, for example, High Resistance (HR) yarns whose tensile modulus is between 220 and 241 GPa and whose stress rupture in tension is between 3450 and 4830 MPa, Intermediate Modulus (IM) yarns whose tensile modulus is between 290 and 297 GPa and whose stress rupture in tension is between 3450 and 6200 MPa, and High Modulus (HM) yarns whose tensile modulus is between 345 and 448 GPa and whose stress rupture in tension is between 3450 and 5520 Pa (based on "ASM Handbook", ISBN 0-87170-703-9, ASM International 2001).

The sheet or sheets of unidirectional carbon fibres used in the context of the invention preferably have a basis weight of 100 to 280 g/m$^2$.

For the creation of a unidirectional sheet, it is possible to spread or not to spread the desired yarns normally available on the market. For example, the thickness of a unidirectional carbon sheet in a material according to the invention, can be from 90 to about 270 µm.

Within each unidirectional sheet present in the material, the filaments or carbon fibres are preferably arranged so as to assure quasi-total and, preferably, total coverage of the entire surface of the sheet.

Examples of thermoplastic materials that can be used to create the permeable layer present in the intermediate material according to the invention or the injected resin, are polyamides (for example PA6, PA12, PA11, PA6,6, PA 6,10, PA 6,12, . . . ), copolyamides, polyamides—block ether or ester (for example PEBAX, PEBA), polyphthalamides, polyesters (for example polyethylene terephthalate—PET-, polybutylene terephthalate—PBT- . . . ), copolyesters, thermoplastic polyurethanes, polyacetals, polyolefins C2-C8 (for example polypropylenes—PP, high density polyethylenes—HDPE, low density polyethylenes—LDPE, linear low density polyethylenes and their copolymers—LLDPE), the polyethersulfones, polysulfones, polyphenylene sulfones, polyetheretherketones, polyetherketoneketones, poly (phenylene sulfides), polyetherimides, thermoplastic polyimides, liquid crystal polymers, phenoxies, block copolymers such as styrene-butadiene-methylmethacrylate copolymers, butyl-methylmethacrylate-acrylate copolymers and mixtures thereof.

Examples of thermosetting materials that can be used to create the permeable layer present in the intermediate material according to the invention or the injected resin are epoxies, unsaturated polyesters, vinyl esters, phenolic resins, polyimides, bismaleimides, phenol-formaldehyde resins, urea-formaldehydes, 1,3,5-triazine-2,4,6-triamine (melamine), the benzoxazines, cyanate esters, and mixtures thereof.

The thermosetting material can also include one or more hardening agents well known to the person skilled in the art, for use with the selected thermosetting polymers.

The fabrics and non-wovens that can be used in the permeable layer or layers can consist of fibres of the same nature, but also of a mixture of fibres consisting of these materials. The material is, of course, adapted to the different types of thermosetting or thermoplastic systems used to create the matrix during the subsequent fabrication of composite parts.

Preferably, the bond between a conductive component and a unidirectional sheet can be ensured by thermal bonding, that is to say by heating, using the heat-adhesion of the thermosetting material, or preferably, of the thermosetting material forming the permeable layer, followed by cooling. An example of such a material is a unidirectional sheet of carbon fibres associated on each of its faces with a fibre non-woven of thermoplastic material, said two non-wovens ensuring the cohesion of the material due to their thermoplastic nature. The conductive component may be integrated in the fibres of the non-woven or present on the surface thereof. In the case of using a metalized non-woven on the surface, it may only be metallized on a portion of its surface as detailed above, intermittently or according to a defined pattern, in order to ensure thermobonding in non-metallized areas. A metal deposition can also be made directly on the surface of the sheet and then covered by a non-woven. It can also be envisaged to obtain the intermediate conductor by metallizing the unidirectional sheet/non-conductive permeable layer(s) complex directly, these being previously associated, preferably by thermobonding. The materials are then used preferably for automated deposition implementing a final step of thermobonding to associate them and thus create a preform, the metallization again being preferably carried out only on a portion of the surface as detailed previously.

In a particular embodiment, the materials according to the invention are neither woven, nor sewn, nor knit. It is thus possible to avoid irregularities that could affect the mechanical properties of the final part obtained.

In the materials according to the invention that include several conductive components and permeable layers, these can all be identical, in particular such as shown in FIGS. 3C, 4B and 4C, or differ from each other, in particular such as shown in FIGS. 4D and 4E. The same is true for the unidirectional sheets. To promote performance consistency, it may be preferable to use layers sandwiched between identical unidirectional sheets and equally identical unidirectional sheets. The materials according to the invention advantageously consist of at least 80% by weight, if not exclusively, of unidirectional sheets of carbon fibres and conductive components and permeable layers as defined in the context of the invention.

In a particular embodiment, the material according to the invention has only one sheet of unidirectional carbon fibres, associated on only one or on each one of its faces with at least one conductive component associated or integrated with a permeable layer in a thermoplastic material or in a mixture of thermoplastic and thermosetting materials. Such material is intended for use in the form of a stack in the fabrication of composite parts. A material consisting exclusively of three layers, namely, a sheet of unidirectional carbon fibres placed between two conductive components+ permeable layer assemblies, is an example of the material according to the invention. When such a material is used to design composite parts, it will most often be used as a stack, such that two conductive components+permeable layer assemblies are sandwiched between two sheets of unidirectional carbon fibres.

In another particular embodiment, the material according to the invention includes several sheets of unidirectional carbon fibres, with at least two sheets of unidirectional carbon fibres extending in different directions, and wherein at least one conductive component associated or integrated with a permeable layer made of a thermoplastic material or a mixture of thermoplastic and thermosetting materials is sandwiched between two successive sheets of unidirectional carbon fibres. Preferably, such multiaxial material will consist of alternating sheets of unidirectional carbon fibres and conductive components+permeable layer assemblies. All the unidirectional sheets may have different directions or only some of them, the others may have identical directions. In cases where several sheets have identical directions, it will not be two consecutive sheets. Otherwise, the unidirectional sheets preferably will have identical characteristics. Preferred orientations are most often those forming an angle of 0°, +45° or −45° (also being +135°), and +90° with the main axis of the part to be produced. 0° corresponds to the axis of the machine for making the stack, in other words the axis that corresponds to the direction of travel of the stack as intended. The main axis of the part which is the longest axis of the part generally coincides with 0°. It is for example possible to make stacks quasi-isotropic, symmetric or oriented by choosing the orientation of the plies. As examples of quasi-isotropic stacks, one may cite stacks at angles 45°/0°/135°/90° or 90°/135°/0°/45°. As examples of symmetrical stacks, one may cite 0°/90°/0° or 45°/135°/45°. In particular, intermediate material consisting of from 2 to 32 unidirectional sheets, notably 2, 3, 4, 8, 16, 24 and 32 unidirectional sheets can be made. Between two unidirectional sheets, conductive components will be sandwiched, associated or integrated with a permeable layer based on a thermoplastic material, or a mixture of thermoplastic and thermosetting materials, as previously described.

The materials according to the invention are intended to be associated with a resin matrix for the subsequent fabrication of composite parts, notably for aviation. The materials according to the invention allow the combination both of satisfactory properties in terms of conductivity, and of mechanical properties that meet the requirements of the aviation field. In the context of the invention, the conductive components, associated or integrated with a permeable layer based on a thermoplastic material, or a mixture of thermoplastic and thermosetting materials previously described, are used in combination with one or more sheets of unidirectional carbon fibres to improve the transverse electrical conductivity of the obtained materials.

The nature of the resin matrix can be thermoplastic or preferably thermosetting, or consist of a mixture of thermosetting and thermoplastic resins. The materials according to the invention can be used notably to produce aircraft parts that require good electrical conductivity properties. Said parts can be created by any known direct process, such as the processes of infusion or injection of thermosetting or thermoplastic resin. The matrix used is preferably thermosetting.

The invention thus also concerns a process for fabricating a composite part characterized in that it comprises the following steps:

a) have at least one material according to the invention, b) diffuse, by infusion or injection, a thermosetting resin, a thermoplastic resin or a mixture of such resins, within the material or materials, c) harden the desired part by a step of polymerization/crosslinking in a defined cycle at temperature and under pressure, followed by cooling.

According to some implementation modes, the process according to the invention comprises a step for stacking several materials according to the invention. In particular, such a stack can be made from a material according to the invention, comprising a single sheet of unidirectional carbon fibres, as previously described. In such a case, it is possible to provide a step for consolidating the stack in the form of a preform.

Such a stack may include a large number of unidirectional sheets, generally at least four and in some cases more than 100 or even more than 200 unidirectional sheets. These sheets of unidirectional carbon fibres are, most often, oriented in at least two, three, or four different directions, between +90° and −90° with respect to the main direction of the final piece obtained.

Preferably, in the context of the invention, the stack is made automatically. Advantageously, the step for consolidating the stack is done by thermobonding by using the hot-melt adhesive quality of the thermoplastic or thermosetting material present in the permeable conductive layers. Preferably, in the context of the invention, the thermosetting or thermoplastic resin or a mixture of such resins, necessary for producing a composite part, is added to the material or materials according to the invention, by infusion under reduced pressure, in particular under a pressure lower than atmospheric pressure, notably below 1 bar and preferably between 0.1 and 1 bar.

The composite part is obtained after a thermal treatment step. In particular, the composite part is generally obtained with a conventional hardening cycle of the considered polymers by performing a thermal treatment recommended by the suppliers of the polymers and known by the person skilled in the art. This hardening stage of the desired part is achieved by polymerization/crosslinking in a defined cycle at temperature and under pressure, followed by cooling. The pressure applied during the treatment cycle is low in the case of infusion under low pressure, and higher in the case of injection into an RTM mould.

The composite parts that can be obtained by the process according to the invention are also integral parts of the invention, and notably the composite parts having a transverse conductivity of at least 20 S/m, and preferably of 60 to 300 S/rm. Transverse conductivity can be defined as the inverse of the resistivity, which is itself equal to the resistance multiplied by the surface and divided by the thickness of the part. In other words, transverse conductivity is the ability of the part to propagate and conduct electrical current within its thickness, and can be measured by the method described in the examples.

Preferably, the parts according to the invention have a fibre volume ratio of 55 to 65% and notably of 57 to 63%. The fibre volume ratio (FVR) of a composite part is calculated from a measurement of the thickness of a composite part, the basis weight of the unidirectional carbon sheet and the properties of the carbon fibre, using the following equation:

$$TVF(\%) = \frac{n_{plis} \times \text{Masse surfacique } UD_{carbone}}{\rho_{fibre\ carbone} \times e_{plaque}} \times 10^{-1} \quad (1)$$

Where $e_{plaque}$ is the thickness of the plate in mm, $\rho_{fibre\ carbone}$ is the density of the carbon fibre in g/cm³. the basis weight of $UD_{carbone}$ is in g/m².

By selecting a sufficiently high fibre volume ratio, in particular of 60 to 65%, it is possible to further optimize the transverse conductivity of the composite part obtained.

The following examples illustrate the invention but have no limiting character.

EXAMPLES OF IMPLEMENTATION

Method for Measuring the Conductivity of Layers Associating a Conductive Component and Thermoplastic Material or Mixture of Thermoplastic and Thermosetting Materials A sample 380 mm long×80 mm wide is cut. This sample is then clamped by two metal jaws across its width. These metal clamps are connected to a power supply (TTi EL302P) which directs a current of 1 A through the sample. In the centre of the sample, two electrodes connected to a voltmeter and 200 mm apart (ISM 1000) are used to measure the voltage. The electrodes are attached to a support, allowing measurement to always be made in the same place; the distance between the electrodes is fixed. One may preferably chose to cut a sample such that its length extends parallel to the direction of the highest conductivity.

Using Ohm's law, the resistance of the sample can be deduced:

$R(\Omega)=U/I$ ($U$ being the voltage measured in volts and $I$ the current applied with the power source in amps)

$\rho=R*(e*L)/l$ ($\rho$ being the resistivity in $\Omega \cdot m$)

$\sigma=l/\rho$ ($\sigma$ being the conductivity in S/m)

(l being the distance between the electrode and L the width of the sample).

Example 1

Description of the Starting Materials web of polyethylene terephthalate (PET) with a basis weight equal to 8 g/m². Said web is covered with 2.7 g/m² of nickel. The web is obtained from Atlanta Nisseki CLAF (ref. Milife TY0503FE), and is metallized by the Soliani corporation, Via Varesina 122, 22100 Como. The metallized web obtained has a basis weight of 10.7 g/m² and a thickness of 50 microns. This metallized web has a conductivity of 1,000 S/m and 30,000 S/m, respectively, in the direction where the yarn density is weaker and in the direction where the yarn density is stronger.

web of polyamide 12, 69 microns thick and 4 g/m², marketed under the reference 128D04 by the Protechnic corporation (Cernay, France)

unidirectional sheet formed with IMA-12K yarns from Hexcel Corporation, so as to obtain a basis weight of 194 g/m².

Preparation of the Material

A polyamide web/carbon sheet/polyamide web/metallized web stack is produced and thermally bonded according to the method described on pages 27 to 30 of application WO 2010/046609. The parameters used in reference to Table 3 of application WO 2010/046609 are given in Table 1 below.

Example 2

Description of Starting Materials

F901 J022 conductive yarns sold by the Resistat company (Enka, N.C., USA)

Nylon 6-6 with conductive carbon surface 24 dTex/22 denier

Tenacity 5 g/denier

Elongation at break: 41%

Average resistivity: $2.1 \cdot 10^5$ Ohm/cm web of copolyamide, 59 microns thick and 3 g/m², marketed under the reference 1R8D03 by the Protechnic corporation (Cernay, France)

unidirectional sheet formed with IMA-12K yarns from Hexcel Corporation, so as to obtain a basis weight of 194 g/m².

Preparation of the Material

A conductive yarns/polyamide web/carbon sheet/polyamide web/conductive yarns stack according to FIG. 3A to 3C is produced. The distance between two parallel yarns 11 is 10 mm and the distance between the yarn 12 and the edge of the non-woven 10 is 3.2 mm. This stack is produced and thermally bonded according to the method described on pages 27 to 30 of application WO 2010/046609. The parameters used in reference to table 3 of application WO 2010/046609 are given in Table 1 below.

Example 3

Description of Starting Materials

F901 J022 conductive yarns sold by the Resistat company (Enka, N.C., USA)

web of copolyamide, 59 microns thick and 3 g/m², marketed under the reference 1R8D03 by the Protechnic corporation (Cernay, France)

unidirectional sheet formed with IMA-12K yarns from Hexcel Corporation, so as to obtain a basis weight of 194 g/m².

Preparation of the Material

A stack according to example 1 is produced, except for the fact that the conductive yarns are arranged between the web and the sheet, as shown in FIG. 4C so as to obtain a polyamide web/conductive yarns/carbon sheet/conductive yarns/polyamide web stack. This stack is thermally bonded according to the method described on pages 27 to 30 of application WO 2010/046609. The parameters used in reference to table 3 of application WO 2010/046609 are given in Table 1 below.

Example 4

Description of Starting Materials

F901 J022 conductive yarns sold by the Resistat company (Enka, N.C., USA)
Nylon 6-6 with conductive carbon surface
49 dTex/44 denier
Tenacity 4 g/denier
Elongation at break: 50%
Average resistivity: $1 \cdot 10^5$ Ohm/cm
web of copolyamide, 59 microns thick and 3 g/m², marketed under the reference 1R8D03 by the Protechnic corporation (Cernay, France)
unidirectional sheet formed with IMA-12K yarns from Hexcel Corporation, so as to obtain a basis weight of 194 g/m².

Preparation of the Material

A conductive yarns/polyamide web/carbon sheet/polyamide web/conductive yarns stack according to example 1 is produced by using the F901 F044 conductive yarns and thermally bonding according to the method described on pages 27 to 30 of application WO 2010/046609. The parameters used in reference to table 3 of application WO 2010/046609 are given in Table 1 below.

TABLE 1

| Example | Line Speed (m/min) | Bar T (° C.) (9) | Bar T (° C.) (9) | Web T before heating (° C.) (11a & 11b) | Bar T (° C.) (12a & 12b) |
|---|---|---|---|---|---|
| 1 | 1.8 | 200 | 200 | 140 | 210 |
| 2 | 1.3 | 200 | 200 | 120 | 145 |
| 3 | 1.3 | 200 | 200 | 120 | 145 |
| 4 | 1.3 | 200 | 200 | 120 | 145 |

Table 2 shows the web thicknesses obtained after lamination on the unidirectional sheet.

TABLE 2

| Example | Metalized PET web + polyamide web thickness | Polyamide web + conductive yarns |
|---|---|---|
| 1 | 30 μm | — |
| 2 | — | 25 μm |
| 3 | — | 25 μm |
| 4 | — | 25 μm |

Example 5

Preparation of Composite Parts

The material is then used to make a laminate with a stack of 24 plies, and then the resin is injected in a RTM process in a closed mould. The panel size is 340×340×4.31 mm for a targeted 60% FVR. To obtain an FVR close to 55% the thickness of the frame selected is 4.73 mm and for an FVR close to 65% the thickness of the frame is 4.00 mm. For a given stack of a ply, by increasing or decreasing the thickness of the mould, the finished part then has a larger or smaller FVR (thickness) because the tests are performed in a closed mould. The draping selected for these samples is [45/0/135/90]3 s.

The stack of 24 plies is placed into an aluminium mould and the mould is then placed under a press at 10 bars. The temperature of the assembly is then increased to 120° C. The resin injected is RTM6 resin from the Hexcel Corporation. The resin is preheated at 80° C. in an injection machine, and then injected into a mould having an inlet for the resin and an outlet. Once the resin is recovered at the outlet, the injection is stopped and the mould is raised to 180° C. for 2 hours. During this period the mould is kept under pressure at 10 bars.

By way of comparison, the stacks produced with the materials consisting of a sheet of 194 g/m² IMA carbon yarns from the Hexcel Corporation, associated on each of their faces with a web of 4 g/m² polyamide 12, 128D04 from the Protechnic corporation (Cernay, France), with different fibre volume ratios have been equally effective.

Measure of Transverse Conductivity of Composite Parts

Three to four samples are cut from the panel with the dimensions 36 mm×36 mm. The surface of each sample is sandblasted to expose the surface of the carbon fibres. This sanding step is not necessary if a peel ply was used for the preparation of the parts. Then the front/back faces of each sample are treated in order to deposit a layer of conductive metal, typically gold by sputtering, plasma treatment or vacuum evaporation. The depositions of gold or other metal must be removed from test areas by sanding or grinding. This deposition of conductive metal permits a low contact resistance between the sample and the measuring means.

A power source (30V/2A TTi EL302P programmable power supply Thurlby Thandar Instruments, Cambridge UK), capable of varying the current and voltage, is used to determine the resistance. The sample is in contact with the two electrodes of the power supply; these electrodes are contacted by means of a clamp. It must be ensured that the electrodes are not in contact with each other or in contact with any other metal element. A current of 1 A is applied and the resistance is measured by two electrodes connected to a voltmeter/ohmmeter. The test is performed on each sample to be measured. The test is performed on each sample to be measured. The resistance value is then brought to the conductivity value using the dimensions of the sample and the following formulas:

Resistivity (Ohm·m)=Resistance (Ohm)×Area (m²)/Thickness (m)

Conductivity (S/m)=1/Resistivity

The results are shown in Table 3 below.

TABLE 3

| Description | Conductivity 4 Points (S/m) | | | Average (S/m) | Standard Deviation (S/m) |
|---|---|---|---|---|---|
| Comparative Example 1—55.7% FVR | 0.55 | 1.77 | 0.76 | 1.03 | 0.65 |
| Comparative Example 2—61.4% FVR | 10.48 | 16.37 | 8.99 | 11.94 | 3.90 |

TABLE 3-continued

| Description | Conductivity 4 Points (S/m) | | | Average (S/m) | Standard Deviation (S/m) |
|---|---|---|---|---|---|
| Comparative Example 3—64.7% FVR | 15.72 | 23.25 | 20.58 | 19.85 | 3.82 |
| Example 5 made with material from example 1—58.4% FVR | 47.81 | 88.63 | 91.26 | 75.90 | 24.36 |

The use of a conductive component makes it possible to greatly improve the conductivity. In addition, the FVR seems to influence the transverse conductivity obtained. It is therefore preferable to produce composite pieces with an FVR of 55 to 70%, preferably 60% to 65%, considering the mechanical parameters also to be taken into account.

Example 5

- web of copolyamide, 131 microns thick and 6 g/m², marketed under the reference 1R8D06 by the Protechnic corporation (Cernay, France)
- unidirectional sheet formed with IMA-12K yarns from Hexcel Corporation, so as to obtain a basis weight of/m².

A polyamide web/carbon sheet/polyamide web stack is produced and thermally bonded according to the method described on pages 27 to 30 of application WO 2010/046609. The parameters used in reference to table 3 of application WO 2010/046609 are given in Table 4 below.

TABLE 4

| Line Speed (m/min) | Bar T (° C.) (9) | Bar T (° C.) (10) | Web T before heating (° C.) (11a & 11b) | Bar T (° C.) (12a & 12b) |
|---|---|---|---|---|
| 1.8 | 200 | 200 | 160 | 180 |

The stack is metallized with nickel deposited along parallel strips 12 mm wide and spaced 16.3 mm and forming an angle of 450 relative to the unidirectional sheet. The surface of the nickel deposit accounts for 42% of the total surface of the material. Deposits of two thicknesses (50 and 200 nm) are made, so as to obtain two different materials.

With a thickness of 50 nm, the ratio of conductive elements/thermoplastic material weight is 3% by weight. With a thickness of 200 nm, this ratio is 12% by weight. The total basis weight of the stack of conductive elements+thermoplastic material is 12.4 g/m² at a thickness of 50 nm and 13.5 g/m² at a thickness of 200 nm.

Each material is then used to make a laminate with a 16 ply stack and then the resin is injected in an RTM process in a closed mould according to Example 5. The panel dimension is 340×340×2.9 mm for a targeted 60% FVR. The drapage chosen for this example is [0/90]4 s.

Conductivity measurements are performed as in Example 5, except that eight samples with dimensions 40 mm×40 mm are cut from the panel, and metallization is carried out with a mixture of zinc and tin, and not with gold.

The results obtained are presented in Tables 5A and 5B below and show that the greater the thickness of the deposit, the higher the conductivity. These results are compared with a reference sample not having been subjected to nickel deposition. To see the gain provided by the invention, the results of the reference are shown in Table 5C.

Tables 5A and 5B

| Nickel Deposit Thickness—50 nm | |
|---|---|
| Sample No. | Conductivity 4 points (S/m) |
| sample 1 | 15.7 |
| sample 2 | 17.3 |
| sample 3 | 10.0 |
| sample 4 | 13.3 |
| sample 5 | 16.3 |
| sample 6 | 12.3 |
| sample 7 | 11.7 |
| sample 8 | 9.4 |
| Average = | 13.3 |

| Nickel Deposit Thickness—200 nm | |
|---|---|
| Sample No. | Conductivity 4 points (S/m) |
| sample 1 | 72.8 |
| sample 2 | 19.7 |
| sample 3 | 19.0 |
| sample 4 | 18.6 |
| sample 5 | 29.5 |
| sample 6 | 24.1 |
| sample 7 | 19.2 |
| sample 8 | 20.3 |
| Average = | 21.6 |

TABLE 5C

| Nickel Deposit Thickness—0 nm | |
|---|---|
| Sample No. | Conductivity 4 points (S/m) |
| sample 1 | 1.1 |
| sample 2 | 1.3 |
| sample 3 | 0.9 |
| sample 4 | 1.2 |
| sample 5 | 1.1 |
| sample 6 | 1 |
| sample 7 | 1.2 |
| sample 8 | 1.1 |
| Average = | 1.1 |

The invention claimed is:

1. A process for making a material for use in the production of composite parts by a method wherein an external thermoplastic or thermosetting matrix is circulated within said material, said process comprising the steps of:
   providing a sheet having a first side and a second side, said sheet comprising unidirectional carbon fibers which extend in a first direction;
   locating a first permeable layer on the first side of said sheet, said first permeable layer comprising a thermoplastic material or a mixture of thermosetting and thermoplastic materials, said first permeable layer having an inner side located nearest to said sheet and an outer side; and locating a plurality of first conductive components on the outer side of said first permeable layer or sandwiched between the first side of said sheet and the inner side of said first permeable layer, said plurality of first conductive components being spaced apart and extending parallel to each other in a second direction, said second direction being at an angle relative to said first direction and wherein said plurality of first conductive components are selected from the group consisting of conductive yarns and conductive metallic deposits.

2. The process according to claim 1 which comprises the steps of:

locating a second permeable layer on the second side of said sheet, said second permeable layer having an inner side located nearest to said sheet and an outer side; and locating a plurality of second conductive components on the outer side of said second permeable layer or sandwiched between the second side of said sheet and the inner side of said second permeable layer, said plurality of second conductive components being spaced apart and extend parallel to each other in a third direction, said third direction being at an angle relative to said first direction.

3. The process according to claim 1 in which said plurality of first conductive components are located on the outer side of said first permeable layer, said process comprising the step of locating a plurality of third conductive components between the first side of said sheet and the inner side of said first permeable layer, said plurality of third conductive components being spaced apart and extending parallel to each other in a fourth direction, said fourth direction being at an angle relative to said first direction.

4. The process according to claim 2 in which said plurality of second conductive components are located on the outer side of said second permeable layer, said process comprising the step of locating a plurality of fourth conductive components between the second side of said sheet and the inner side of said second permeable layer, said plurality of fourth conductive components being spaced apart and extending parallel to each other in a fifth direction, said fifth direction being at an angle relative to said first direction.

5. The process according to claim 4 in which said plurality of first conductive components are located on the outer side of said first permeable layer, said process comprising the step of locating a plurality of third conductive components between the first side of said sheet and the inner side of said first permeable layer, said plurality of third conductive components being spaced apart and extending parallel to each other in a fourth direction, said fourth direction being at an angle relative to said first direction.

6. The process according to claim 2 wherein said second conductive components are selected from the group consisting of conductive yarns and conductive metallic deposits.

7. The process according to claim 3 wherein said plurality of third conductive components are selected from the group consisting of conductive yarns and conductive metallic deposits.

8. The process according to claim 4 wherein said plurality of second conductive components and said plurality of fourth conductive components are selected from the group consisting of conductive yarns and conductive metallic deposits.

9. The process according to claim 5 wherein said plurality of second conductive components, said plurality of third conductive components and said plurality of fourth conductive components are selected from the group consisting of conductive yarns and conductive metallic deposits.

10. The process according to claim 1 wherein said sheet is bound to the thermoplastic or thermosetting material of the first permeable layer by thermobonding.

11. The process according to claim 2 wherein said sheet is bound to the thermoplastic or thermosetting material of the second permeable layer by thermobonding.

12. The process according to the claim 1 wherein said plurality of first conductive components cover from 10 to 40% of outer or inner side of said first permeable layer.

13. The process according to claim 1 wherein said sheet of unidirectional carbon fibers has a surface density of 100 to 280 g/m$^2$.

14. The process according to claim 1 which includes an additional step, said additional step comprising infusing an infusion resin into said material to form an infused material, said infusion resin being selected from the group consisting of a thermosetting resin, a thermoplastic resin and a mixture thereof.

15. The process according to claim 14 wherein a thermosetting resin is infused into said material, said process including a step of curing the thermosetting resin to form a composite part.

16. A process for making a composite part comprising the steps of:

providing said material made according to claim 1; and infusing an infusion resin into said material made according to claim 1 to form an infused material, said infusion resin being selected from the group consisting of a thermosetting resin, a thermoplastic resin and a mixture thereof.

17. A process for making a composite part comprising the steps of:

providing said material made according to claim 2; and infusing an infusion resin into said material made according to claim 2 to form an infused material, said infusion resin being selected from the group consisting of a thermosetting resin, a thermoplastic resin and a mixture thereof.

18. The process according to claim 16 which includes a step of curing the infusion resin present in said infused material to form a composite part.

19. The process according to claim 17 which includes a step of curing the infusion resin present in said infused material to form a composite part.

* * * * *